(12) United States Patent
Allard et al.

(10) Patent No.: US 12,717,171 B2
(45) Date of Patent: Aug. 25, 2026

(54) OPHTHALMIC LENS COMPRISING A FILTER AND A METHOD FOR DETERMINING A FILTER IMPROVING MOTION SENSITIVITY OF A WEARER

(71) Applicant: ESSILOR INTERNATIONAL, Charenton-le-Pont (FR)

(72) Inventors: Rémy Allard, Champs sur Marne (FR); Marie Dubail, Saint-Maurice (FR)

(73) Assignee: Essilor International, Charenton-le-Pont (FR)

( * ) Notice: Subject to any disclaimer, the term of this patent is extended or adjusted under 35 U.S.C. 154(b) by 325 days.

(21) Appl. No.: 18/571,656

(22) PCT Filed: Jul. 29, 2022

(86) PCT No.: PCT/EP2022/071450
§ 371 (c)(1),
(2) Date: Dec. 18, 2023

(87) PCT Pub. No.: WO2023/007000
PCT Pub. Date: Feb. 2, 2023

(65) Prior Publication Data

US 2024/0288714 A1 Aug. 29, 2024

(30) Foreign Application Priority Data

Jul. 30, 2021 (EP) .................................... 21306065

(51) Int. Cl.
*G02C 7/10* (2006.01)

(52) U.S. Cl.
CPC .................................... *G02C 7/104* (2013.01)

(58) Field of Classification Search
CPC ............. G02C 7/104; G02C 7/10; G02C 7/00
(Continued)

(56) References Cited

U.S. PATENT DOCUMENTS 11,809,026 B2 * 11/2023 Martins .................. G02C 7/104
11,857,254 B2 * 1/2024 Allard .................... A61B 3/022
(Continued)

FOREIGN PATENT DOCUMENTS

EP 2946245 A1 11/2015
WO 2014111099 A1 7/2014
WO 2017194898 A1 11/2017

OTHER PUBLICATIONS

International Search Report for PCT/EP2022/071450 mailed Nov. 11, 2022, 3 pages.
(Continued)

*Primary Examiner* — William R Alexander
(74) *Attorney, Agent, or Firm* — NIXON & VANDERHYE, PC

(57) ABSTRACT

The invention concerns a method for determining a filter for a visual equipment intended to be placed in front of the eye of a wearer, the filter being able to improve motion sensitivity of the wearer, the method including the following steps: i. subjecting the wearer to a plurality of visible light spectra having different levels of light intensity within the range of wavelengths from 400 to 600 nm; ii. determining a value representative of a dynamic contrast sensitivity of the wearer for each of the plurality of light spectra; iii. selecting at least one light spectrum based on the values improving the dynamic contrast sensitivity; and iv. determining the filter based on the at least one selected light spectrum.

16 Claims, 6 Drawing Sheets

(58) Field of Classification Search
USPC .......................................................... 351/41
See application file for complete search history.

(56) References Cited

U.S. PATENT DOCUMENTS

| | | | | |
|---|---|---|---|---|
| 2015/0323813 | A1* | 11/2015 | Lingelbach | G02C 7/104 351/44 |
| 2017/0371179 | A1* | 12/2017 | Scherlen | G02C 7/027 |
| 2019/0212581 | A1* | 7/2019 | Scherlen | G02C 7/102 |
| 2020/0209648 | A1* | 7/2020 | Scherlen | G02C 7/10 |
| 2021/0093182 | A1* | 4/2021 | Allard | A61B 3/0041 |
| 2021/0318557 | A1* | 10/2021 | Martins | G02C 7/104 |
| 2023/0050368 | A1* | 2/2023 | Scherlen | G02C 7/027 |

OTHER PUBLICATIONS

Written Opinion of the ISA for PCT/EP2022/071450 mailed Nov. 11, 2022, 5 pages.

* cited by examiner

Pupil diamater (color/white)

1,6
0,8
425 450 475 500 525 550 575
Subject 1

1,6
0,8
425 450 475 500 525 550 575
Subject 2

1,6
0,8
425 450 475 500 525 550 575
Subject 3

1,6
0,8
425 450 475 500 525 550 575
Subject 4

80 cd/m2
27 cd/m2
8 cd/m2
3 cd/m2

1,6
0,8
425 450 475 500 525 550 575
Subject 5

1,6
0,8
425 450 475 500 525 550 575
Subject 6

1,6
0,8
425 450 475 500 525 550 575
Subject 7

Cone activity gain (with and without filter)
157 cd/m2
50 cd/m2
16 cd/m2
5 cd/m2
2
1
0,5
0,25
0,125
0,0625
0,03125
450 500 550 600 650 700
Cutoff wavelength (nm)
Cones L
Cones M
Cones S Cone activity gain (with and without filter)
80 cd/m2
27 cd/m2
8 cd/m2
3 cd/m2
2
1
0,5
0,25
450 475 500 525 550 575
Cutoff wavelength (nm)
Cones L
Cones M
Cones S

OPHTHALMIC LENS COMPRISING A FILTER AND A METHOD FOR DETERMINING A FILTER IMPROVING MOTION SENSITIVITY OF A WEARER

CROSS-REFERENCE TO RELATED APPLICATIONS

This application is the U.S. national phase of International Application No. PCT/EP2022/071450 filed Jul. 29, 2022 which designated the U.S. and claims priority to EP 21306065.0 filed Jul. 30, 2021, the entire contents of each of which are hereby incorporated by reference.

FIELD OF THE INVENTION

The present invention relates to the manufacturing of visual equipment, for example ophthalmic lenses.

More particularly, the invention relates to method for determining a filter for a visual equipment intended to be placed in front of the eye of a wearer.

BACKGROUND OF THE INVENTION

Sunglasses are often used for comfort and protection with regard to light. However, filters (e.g., sunglasses) decrease the number of photons entering the eye and the retinal illumination (i.e., global transmission). This retinal illumination decreasing usually has the side effect of decreasing dynamic contrast sensitivity of the wearer, thereby decreasing motion perception. Activities requiring high dynamic contrast sensitivity are those involving motion (high temporal frequencies) and low contrasts, such as driving for detecting obstacles and pedestrians, ball sports for reducing reaction time, speed sports (ski, snowboard, speed skating . . . ) and video games.

Thus, there is a need for a filter able to increase motion perception of the wearer without reducing light comfort and protection.

SUMMARY OF THE INVENTION

To that end, the invention provides a method for determining a filter for a visual equipment intended to be placed in front of the eye of a wearer, said filter being able to improve motion sensitivity of said wearer, the method comprising the following steps:

i. subjecting the wearer to a plurality of visible light spectra having different levels of light intensity within the range of wavelengths from 400 to 600 nm;
ii. determining a value representative of a dynamic contrast sensitivity of the wearer for each of the plurality of light spectra;
iii. selecting at least one light spectrum based on the values improving the dynamic contrast sensitivity; and
iv. determining the filter based on the at least one selected light spectrum.

Dynamic contrast sensitivity and motion perception depend on the retinal illumination and are driven by the stimulation of M and L cones. Dynamic contrast sensitivity may comprise temporal contrast sensitivity and/or motion perception. Cones are photoreceptor cells in the retina of the eye, as rods. Human eyes have three types of cones: S for short wavelengths, M for medium wavelengths and L for long wavelengths.

Retinal illumination, measured in Trolands (Td), depends on the luminous intensity provided to the eye (luminance) and the pupil diameter.

It has been observed that dynamic contrast sensitivity increases with luminance before it saturates above a given luminance intensity. For low temporal frequencies, the saturation occurs above relatively low luminance intensities, but for high temporal frequencies, sensitivity improves with luminance intensity even up to relatively high luminance intensities (e.g., above 500 Td). For example, it may be interesting for very specific activities requiring perception of moving objects to improve sensitivity to high temporal frequencies, which could be done by increasing retinal illuminance intensity, that is, the number of photons reaching the retina. Providing light with high temporal frequency allows to shift saturation and thereby increase motion perception and dynamic contrast sensitivity as well as reaction time.

Then, pupil reaction is driven by cones and rods and depends on the luminance and the spectral component of the light stimulation. It also depends on the spectral sensitivity of the ipRGC (intrinsically photosensitive retinal ganglion cells). It means that for a given luminance, a short wavelength stimulation will produce a larger and longer pupil constriction compared to a long wavelength light.

Selecting at least one light spectrum based on the values improving the dynamic contrast sensitivity, particularly medium and long wavelengths, thus allows to both reduce pupil constriction and increase motion perception and dynamic contrast sensitivity. It may be obtained by designing the filter to cut short wavelengths.

In other words, filters (e.g., sunlens) decreases the number of photons reaching the eye (i.e., luminous intensity), but the corresponding decrease of motion sensitivity may be prevented due to a specific spectral transmission of the filter.

According to an embodiment of the determining method, the level of light intensity of at least one of the light spectra is reduced in a wavelength range from 400 nm to a value X; said value X ranging from more than 400 nm to 600 nm; and said value X differing for each of the light spectra.

According to an embodiment of the determining method, the value X varies by increment from 400 nm to 600 nm between successive light spectra, preferably by equal increments, more preferably by increments of 25 nm.

According to an embodiment of the determining method, the step of determining the value representative of the dynamic contrast sensitivity of the wearer for each of the plurality of light spectra comprises the step of measuring the pupil diameter of the wearer for each of the plurality of light spectra.

According to an embodiment of the determining method, the step of determining the value representative of the dynamic contrast sensitivity of the wearer for each of the plurality of light spectra comprises the step of determining the cone activity gain for each of the plurality of light spectra from the measurements of the pupil diameter.

According to an embodiment of the determining method, the cone activity is determined from the pupil diameter using the following equation: cone activity$=\pi(Ø/2)^2\times\int P(\lambda)\cdot T(\lambda)\cdot V(\lambda)\cdot T_{crystalline}(\lambda)\cdot d\lambda$; wherein Ø is the pupil diameter, $P(\lambda)$ is the light spectrum, $T(\lambda)$ is the lens transmission as a function of the wavelength ($\lambda$), $V(\lambda)$ is the luminous efficiency of a photon as a function of the wavelength ($\lambda$) by photoreceptors and $T_{crystalline}(\Delta)$ is the lens transmission of the crystalline lens as a function of the wavelength ($\lambda$).

Cone activity gain may be also determined depending on at least two pupil diameter values. Cone activity gain is the ratio between cone activity through the lens on cone activity without lens. This cone activity gain may be expressed as follows:

$$\text{Cone activity gain} = \frac{\text{cone activity}(\phi_{with\ filter})}{\text{cone activity}(\phi_{without\ filter})}$$

or, $$\text{Cone activity gain} = \frac{(\phi_1)^2 \times \int P(\lambda) \cdot T(\lambda) \cdot V(\lambda) \cdot T_{crystalline}(\lambda) \cdot d\lambda}{(\phi_2)^2 \times \int P(\lambda) \cdot V(\lambda) \cdot T_{crystalline}(\lambda) \cdot d\lambda}$$

wherein $\varnothing_1$ is the pupil diameter with filter, $\varnothing_2$ is the pupil diameter without filter, $P(\lambda)$ is the light spectrum, $T(\lambda)$ is the lens transmission as a function of the wavelength ($\lambda$), $V(\lambda)$ is the luminous efficiency of a photon as a function of the wavelength ($\lambda$) by photoreceptors and $T_{crystalline}(\Delta)$ is the lens transmission of the crystalline lens as a function of the wavelength ($\lambda$).

According to an embodiment of the determining method, wherein the cone activity is determined from the pupil diameter using the following equation: cone activity (age) $=(\pi(\varnothing/2)^2 \times \int P(\lambda) \cdot T(\lambda) \cdot V(\lambda) \cdot T_{crystalline}(\text{age}, \Delta) \cdot d\lambda_y$; wherein $\varnothing$ is the pupil diameter, $P(\lambda)$ is the light spectrum, $T(\lambda)$ is the lens transmission as a function of the wavelength ($\lambda$) and $V(\lambda)$ is the luminous efficiency of a photon as a function of the wavelength ($\lambda$) by photoreceptors and $T_{crystalline}(\text{age},\lambda)$ is the lens transmission of the crystalline lens as a function of the age and the wavelength ($\lambda$).

Cone activity gain may also be determined depending on the age using the abovementioned formula of the cone activity gain.

Colored filter may be different from one person to another and vary depending on the age. Considering the age when determining the cone activity gain allows to adapt the selected light spectrum to the type of filter and the potential changes of the eye particularities depending on the age.

According to an embodiment of the determining method, the step of determining the cone activity gain takes into account at least one characteristic of the wearer to customize cone activity gain determination.

This characteristic may be the age of the wearer or the luminous efficiency of the wearer. These characteristics allow to have more accurate results which are closer to the wearer's needs.

According to an embodiment of the determining method, the value representative of the dynamic contrast sensitivity of the wearer for each of a plurality of light spectra is determined based on a perception test.

According to an embodiment of the determining method, the perception test comprises the step of determining at least one feature of a dynamic visual stimulus.

According to an embodiment of the determining method, the perception test comprises the step of determining the direction of the dynamic visual stimulus.

According to an embodiment of the determining method, the plurality of light spectra comprises light spectra having a luminance ranging from 50 cd/m$^2$ to 300 cd/m$^2$, preferably from 100 cd/m$^2$ to 200 cd/m$^2$.

According to an embodiment of the determining method, the filter is determined at step iv) based on the at least one selected light spectra and selected transmission of the filter.

According to an embodiment of the determining method, the filter is selected as having the highest transmittance in a targeted range.

The invention also provides an ophthalmic lens intended to be placed in front of the eye of a wearer to improve motion sensitivity of said wearer comprising a filter determined with the method described above.

The invention also provides a computer program comprising instructions for performing the method as described above.

The invention further provides a device comprising memory having recorded thereon the computer program as described above, the device optionally further comprising a processor and a graphical wearer interface coupled to the memory.

BRIEF DESCRIPTION OF THE DRAWINGS

For a more complete understanding of the description provided herein and the advantages thereof, reference is now made to the brief descriptions below, taken in connection with the accompanying drawings and detailed description, wherein like reference numerals represent like parts.

DETAILED DESCRIPTION OF EMBODIMENTS

Figure 1:
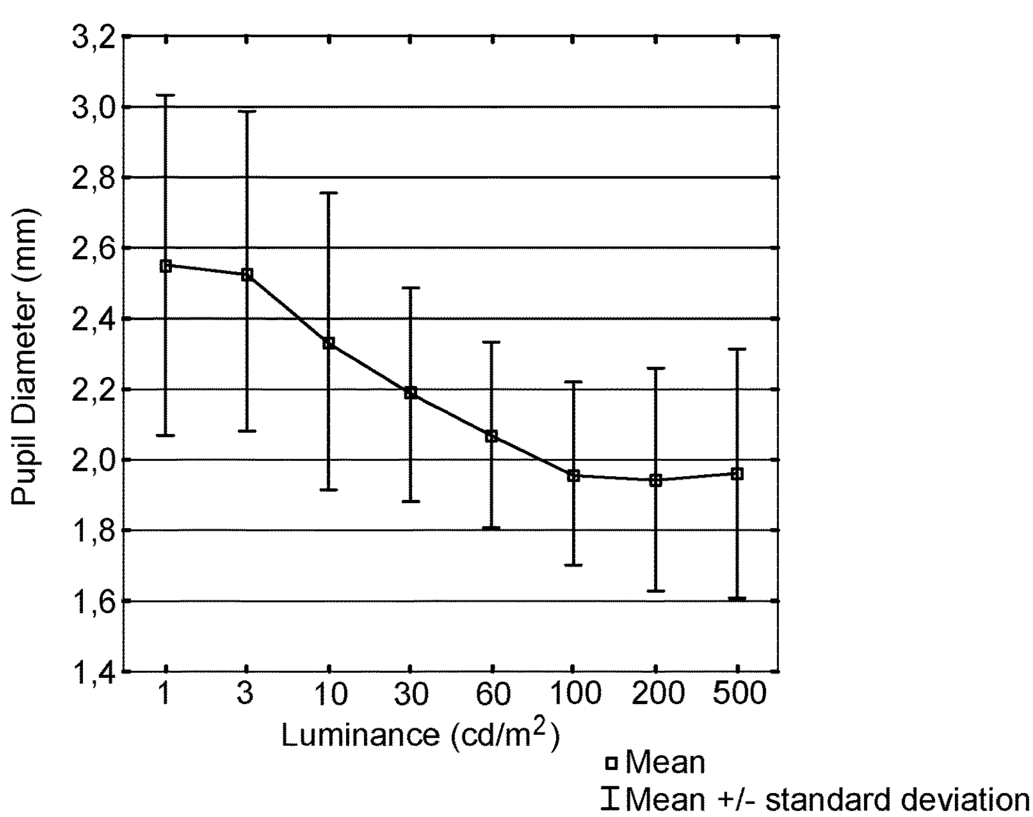
FIG. 1 shows a graph illustrating the pupil diameter as a function of the luminance for an experiment involving 20 subjects.

In the description which follows, the drawing figures are not necessarily to scale and certain features may be shown in generalized or schematic form in the interest of clarity and conciseness or for informational purposes. In addition, although making and using various embodiments are discussed in detail below, it should be appreciated that as described herein are provided many inventive concepts that may embodied in a wide variety of contexts. Embodiments discussed herein are merely representative and do not limit the scope of the invention. It will also be obvious to one skilled in the art that all the technical features that are defined relative to a process can be transposed, individually or in combination, to a device and conversely, all the technical features relative to a device can be transposed, individually or in combination, to a process.

The terms "comprise" (and any grammatical variation thereof, such as "comprises" and "comprising"), "have" (and any grammatical variation thereof, such as "has" and "having"), "contain" (and any grammatical variation thereof, such as "contains" and "containing"), and "include"

(and any grammatical variation thereof such as "includes" and "including") are open-ended linking verbs. They are used to specify the presence of stated features, integers, steps or components or groups thereof, but do not preclude the presence or addition of one or more other features, integers, steps or components or groups thereof. As a result, a method, or a step in a method, that "comprises", "has", "contains", or "includes" one or more steps or elements possesses those one or more steps or elements but is not limited to possessing only those one or more steps or elements.

The claimed method allows to determine a filter for a visual equipment intended to be placed in front of the eye of a wearer.

The visual equipment may be an ophthalmic lens or pair of ophthalmic lenses, possibly active lenses, or a solar lens or pair of solar lenses, or an ophthalmic solar lens or pair of ophthalmic solar lenses. It may be in the form of glasses or contact lenses or intra-ocular lenses. For example, it may be a pair of progressive lenses. The solar lens may be of any class among 0, 1, 2, 3 or 4.

Said filter is configured to improve dynamic contrast sensitivity, reaction time and motion perception of the wearer.

A filter may be determined for each eye of an individual. In this case, said filters determined for each eye may be the same or different. Also said filters may even be chosen so as to provide a good compromise between both eyes of the individual.

Motion perception is driven by long wavelengths (L) and medium wavelengths (M) cones signal and thus depends on their spectral sensitivity.

For high temporal frequencies, motion perception is proportional to luminance intensity, even up to photopic luminance. It depends on the number of photons absorbed by photosensitive opsin located on each L and M cones. Besides, in photopic conditions, pupil diameter is driven by cones sensitivity and melanopic sensitivity (short wavelengths).

Thus, it is possible to increase M and L signal filtering shorter wavelengths (under 530 nm or under 480 nm). For luminance values lower the limit responsible for pupil myosis, filtering those wavelengths increases pupil diameter. FIG. 1 shows the change of pupil diameter depending on the luminance of white light for 20 subjects from 20 to 85 years old. Graph of FIG. 1 shows that myosis occurs around 100 cd/m$^2$. Individually it can be reached under higher luminance.

The aim of the invention is to increase the number of photons absorbed by L and M cones (due to the larger pupil diameter) to improve motion perception of high temporal frequency stimuli, in an effective way. Motion perception is thus increased by increasing the retinal illumination and comfort towards light or the visibility of objects. The effect particularly applies for transmitted luminance under 200 cd/m$^2$.

First and second experiments was conducted to demonstrate the efficiency of the determined method according.

A first experiment was conducted twice on five and seven young subjects to assess the gain in motion perception with a high-pass filter. By "high-pass filter", we mean a filter that passes signals with a wavelength higher than a certain cutoff wavelength. In other words, short wavelengths are cut so that only medium and long wavelength passes through the filter.

The apparatus which is used is MonColor™ from Metrovision used in a continuous light irradiation method. This system is equipped with a camera operating in the near IR.

The wearer was subjected to a white light composed of 5 leds (414, 465, 525, 619, 660 nm) and was considered as the reference. This white light corresponds to a light source. The effect of filtering short wavelengths was then simulated by turning off the leds. The four levels of luminance were 5, 16, 50 and 157 cd/m$^2$ for the first trial involving five subjects and 3, 8, 27 and 80 cd/m$^2$ for the second trial involving seven subjects.

Figure 2:
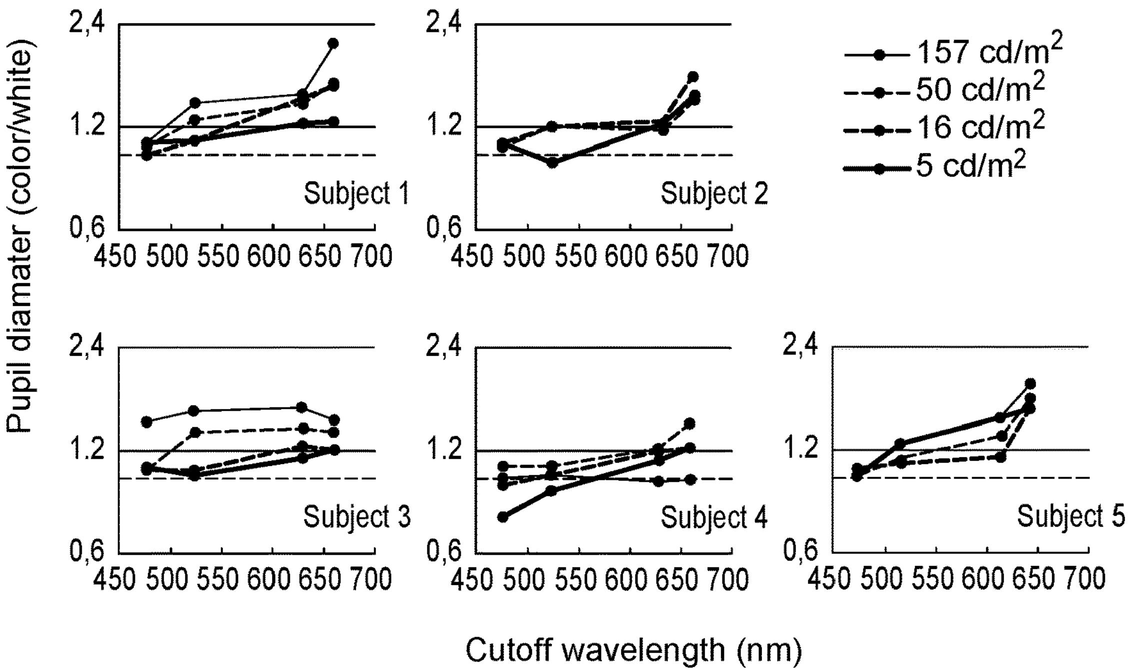
FIGS. 2 and 3 show a plurality of graphs illustrating pupil diameter as a function of the cutoff wavelength for different luminance intensities for two experiments involving five and seven subjects, respectively.
Figure 3:

Results of this first experiment are shown on the graphs of FIGS. 2 and 3 which illustrates the impact of high-pass filters (light simulation) on pupil diameter on said 5 and 7 subjects under 4 levels of luminance. This first experiment showed that for a majority of subjects the pupil diameter increases when filtering wavelength under 465 or 525 nm, four subjects on 7 for the second trial.

Another way to obtain the same results is to use the characteristics of the light source constant (i.e. not turning off the leds) and use a filter, for example a lens filtering short wavelengths typically under 530 nm or under 480 nm). The transmission of such a lens filtering in short wavelengths will be identified as T(λ).

From the pupil diameter measurement depending on the wavelength, it is then possible to determine a cone activity with filtered light compared to white light (unfiltered light). This cone activity may be obtained with the following first equation:

$$\text{Cone activity} = \left(\prod(\emptyset/2)^2 \times \int P(\lambda)\cdot T(\lambda)\cdot V(\lambda)\cdot T_{crystalline}(\lambda)\cdot d\lambda_y\right.$$

wherein

Ø is the pupil diameter,

P(λ) is the light spectrum, (P(λ) can be a spectrum having a constant emission value whatever the wavelength on the whole visible range as described above or can be variable depending on λ, for example a SD65 spectrum having a spectrum distribution of radiation of CIE standard illuminant D65 (ISO/CIE/10526).

T(λ) is the lens transmission as a function of the wavelength (λ),

V(λ) is the luminous efficiency of a photon as a function of the wavelength (λ) by photoreceptors for daylight (ISO CIE 10527), and $T_{crystalline}(\Delta)$ is the lens transmission of the crystalline lens of a person as a function of the wavelength (λ)

Cone activity gain may be also determined depending on at least two pupil diameter values. Cone activity gain is the ratio between cone activity through the filter on cone activity without filter. This cone activity gain may be obtained with the following first equation:

$$\text{cone activity gain} = \frac{\prod(\emptyset_1/2)^2 \times \int P(\lambda)\cdot T(\lambda)\cdot V(\lambda)\cdot T\text{ crystalline }(\lambda)\cdot d\lambda}{\prod(\emptyset_2/2)^2 \times \int P(\lambda)\cdot V(\lambda)\cdot T\text{ crystalline }(\lambda)\cdot d\lambda}$$

wherein $\emptyset_1$ is the pupil diameter through the lens, $\emptyset_2$ is the pupil diameter without the lens P(λ) is the light spectrum, $T(\lambda)$ is the lens transmission as a function of the wavelength ($\lambda$), $V(\lambda)$ is the luminous efficiency of a photon as a function of the wavelength ($\lambda$) by photoreceptors, and $T_{crystalline}(\Delta)$ is the lens transmission of the crystalline lens as a function of the wavelength ($\lambda$)

$T_{crystalline}(\Delta)$ may be determined on the basis of an observation of the eye of the wearer in order to classify the lens crystalline opacity in different categories. An estimation of the value of $T_{crystalline}(\Delta)$ may be then obtained based on the attributed classification.

In both cases, in the test with and without using the lens filtering in the short wavelengths, the luminance of the $P(\lambda)$ spectra are preferably maintained constant or sensibly constant.

A second experiment was conducted on seven subjects to determine the effect of the chromaticity on cone activity gain.

Figures 4, 5:
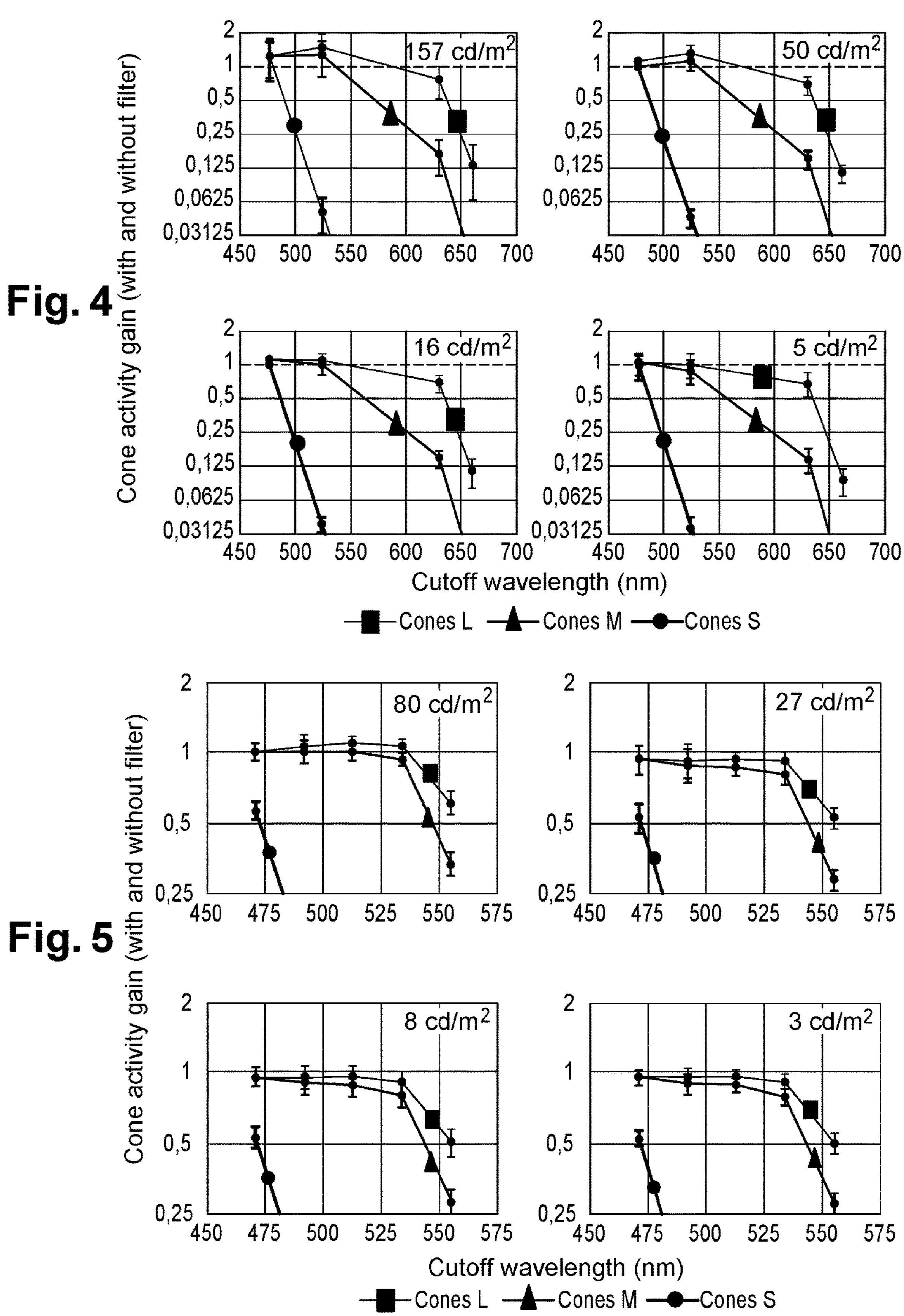
FIGS. 4 and 5 show a plurality of graphs illustrating cone activity gain as a function of the cutoff wavelength for different luminance intensities.

Results of this second experiment are shown on the graphs of FIGS. 4 and 5. This second experiment shows that the cone activity gain is increased for a majority of subjects when filtering wavelength under 465 or 525 nm for a luminance above 50 cd/m$^2$. Indeed, we can observe that the cone activity gain is increased (close to or above 1) for M and L cones from 50 cd/m$^2$ with a cutoff wavelength under 465 or 525 nm. For long cutoff wavelength, we can see that the cone activity gain for M and L cones is under 1 or decreases to 0.5 or 0.25.

The age may also be considered when determining the cone activity. For example, a filter may be determined for different groups of age, as for example for young or old people. Alternatively, the age may be considered when determining the cone activity gain directly by considering the age of the wearer. The cone activity gain depending on the age may be obtained with the following second equation:

$$\text{cone activity gain (age)} = \frac{\prod(\phi_1/2)2 \times \int P(\lambda)\cdot T(\lambda)\cdot V(\lambda)\cdot T\,\text{crystalline (age, }\lambda)\cdot d\lambda}{\prod(\phi_2/2)2 \times \int P(\lambda)\cdot V(\lambda)\cdot T\,\text{crystalline (age, }\lambda)\cdot d\lambda}$$

wherein $Ø_1$ is the pupil diameter through the lens, $Ø_2$ is the pupil diameter without the lens, $P(\lambda)$ is the light spectrum, $T(\lambda)$ is the lens transmission as a function of the wavelength ($\lambda$), $V(\lambda)$ is the luminous efficiency of a photon as a function of the wavelength ($\lambda$) by photoreceptors, and $T_{crystalline}(\text{age},\lambda)$ is the lens transmission of the crystalline lens as a function of the age and the wavelength ($\lambda$)

Figure 10:
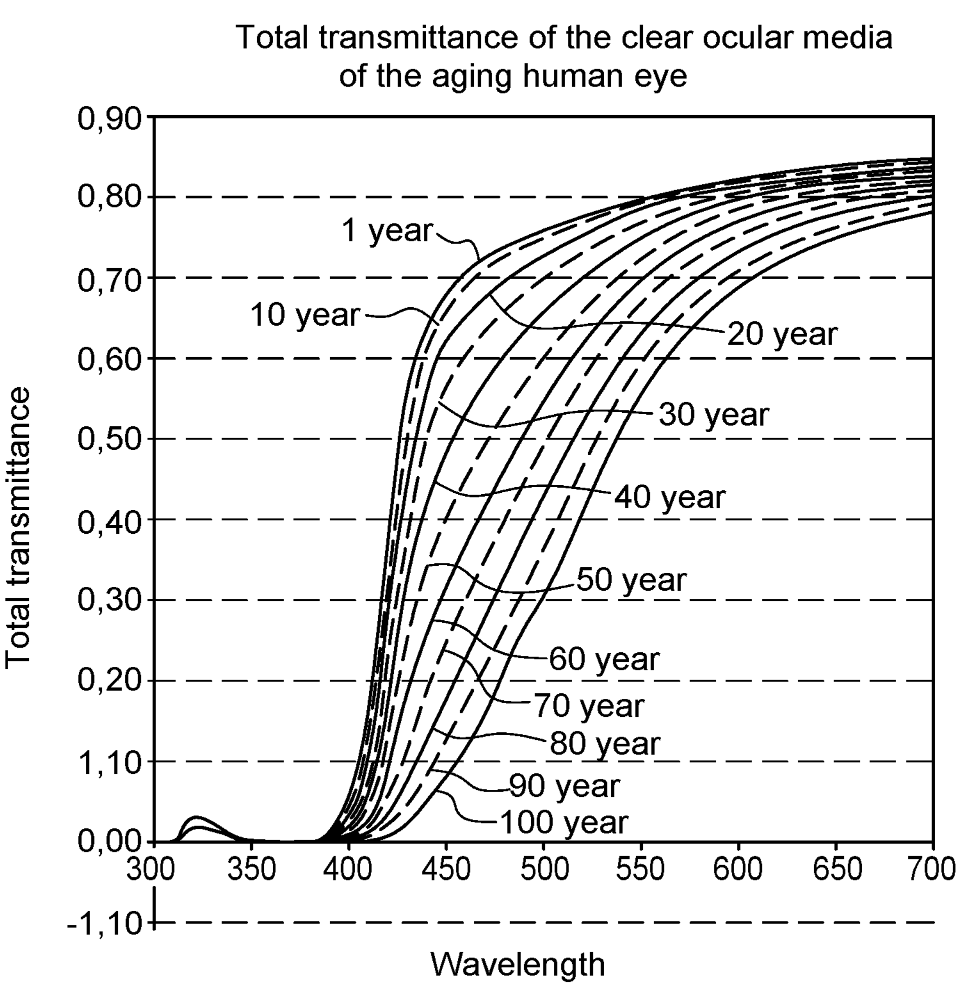
FIG. 10 is a graph illustrating the total transmittance of the clear ocular media of the aging human eye depending on the wavelength [from CIE 203 2012—Transmittance data reaching the retina for a healthy ageing eye]

In the context of this application, $T_{crystalline}(\text{age}, \lambda)$ will be the same as the transmittance of an ocular media as a function of the wavelength A as defined above and in FIG. 10. The curve to be chosen for the calculation will depend on the age of the person. The chosen curve will be the one corresponding to the decade which is the closest to the age of the person. The age, the luminous efficiency and the lens transmission of the crystalline may be chosen using tables or generic data. The luminous efficiency $V(\lambda)$ is the ability of the wearer's eye to absorb light and send the related information to the visual system of the wearer.

Alternatively, it is possible to consider at least one characteristic of the wearer when determining the cone activity gain. It allows to customize the cone activity gain calculation to make the determination of the filter more accurate. This at least one characteristic is preferably a physical characteristic of the wearer. These characteristics of the wearer may comprise one or more among the age of the wearer, the luminous efficiency of the wearer and the transmission of the crystalline lens of the user.

Figures 6, 7:
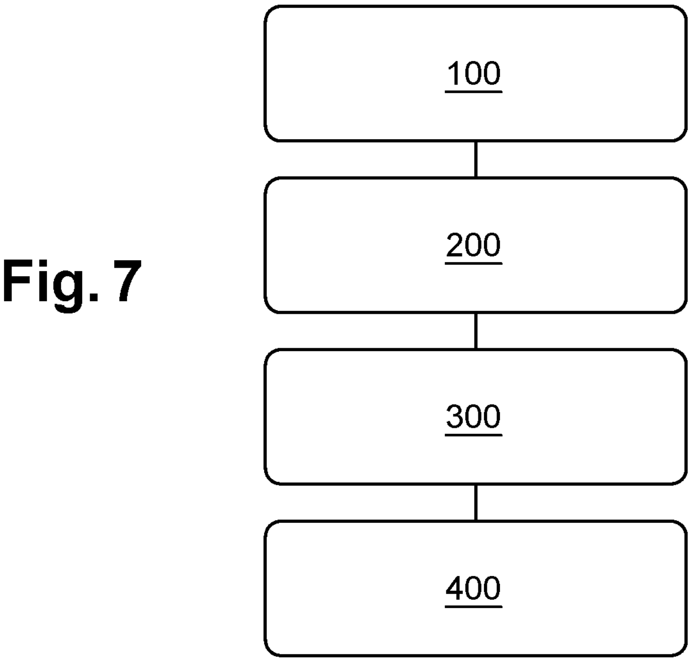
FIG. 6 shows an example of a dynamic visual stimulus.
FIG. 7 shows a chart of a method for determining a filter improving motion perception.

As shown on FIG. 7, said determining method comprises a first step 100 of subjecting the wearer to a plurality of visible light spectra, a second step 200 of determining a value representative of a dynamic contrast sensitivity of the wearer, a third step 300 of selecting at least one light spectrum and a fourth step 400 of determining a filter based on said at least one selected light spectrum.

During first step 100 comprises subjecting the wearer to a plurality of visible light spectra having different levels of light intensity within the range of wavelengths from 400 to 600 nm. The level of light intensity of at least one of the light spectra is reduced in a wavelength range from 400 nm to a value X. Said value X ranges from more than 400 to 600 nm, with said value X differing for each of the light spectra. In a preferred amendment, said value X varies by increment from 400 to 600 nm between successive light spectra, preferably by equal increments, more preferably by increments of 25 nm.

This difference in the level of light intensity provided to the wearer is obtained using preferably high pass filters, filtering between 400 nm and said value X. More generally, other types of filtering lenses may be used, as band pass or continuous filters.

Light spectra have a luminance above 50 cd/m$^2$, preferably above 100 cd/m$^2$. More specifically, light spectra have a luminance ranging from 50 cd/m$^2$ to 300 cd/m$^2$, preferably from 100 cd/m$^2$ to 200 cd/m$^2$. Alternatively, or in combination, luminance may be selected according to the final product (clear lens or sunlens) to match a realistic lightning environment or a specific Tv for clear lens. Tv is the luminous transmittance in the visible spectrum.

Tv (also identified as $\lambda v$) is defined according to the following formula $$\tau_v = 100 \times \frac{\int_{380\,nm}^{780\,nm} \tau(\lambda)\cdot V(\lambda)\cdot SD65\lambda(\lambda)\cdot d\lambda}{\int_{380\,nm}^{780\,nm} V(\lambda)\cdot SD65\lambda(\lambda)\cdot d\lambda}\%$$

where $\tau(\lambda)$ is the spectral transmittance of the tinted spectacle lens;

$V(\lambda)$ is the spectral luminous efficiency function for daylight (see ISO/CIE 10527);

$S_{D64\lambda}(\lambda)$ is the spectral distribution of radiation of CIE standard illuminant D 65 (see ISO/CIE 10526).

If tests are performed with a sunlens, then the luminance of the light spectra should be increased up to 20 times the above values depending on the level of filtration of the sunlens, so that luminance received by the eye during the test stays above 50 cd/m$^2$ and preferably within the range of 50 to 300 cd/m$^2$ The pupil diameter of the wearer is measured for each of the plurality of light spectra. This measurement may be performed using a high temporal frequency camera to have accurate measurements with a high temporal frequency screen.

During the second step 200, a value representative of a dynamic contrast sensitivity of the wearer is determined for each of the plurality of light spectra. This value representative of a dynamic contrast is for example the cone activity gain. Cone activity gain is deduced from the measurements of the pupil diameter. Particularly, cone activity gain is calculated using the first second equation provided above. The age may be also considered when calculating the cone activity gain using the second equation provided above. Particularly, the age of the wearer may be used to provide more accurate results.

Said value representative of the dynamic contrast sensitivity, e.g. the cone activity gain, is preferably determined based on a perception test. Particularly, this perception test may comprise determining at least one feature of a dynamic visual stimulus. This at least one feature is for example the direction of said dynamic visual stimulus. An example of a stimulus is shown on FIG. 6.

To measure dynamic contrast sensitivity, subjects have to focus on a target or dynamic visual stimulus, on a specific screen (e.g. VPIXX, high speed screen) and to determine in which direction the dynamic visual stimulus (e.g. a vertical sinusoidal grating of 0.5 cycles/degree, temporal frequency of 40 Hz) is moving (left or right). Contrast varies according to their response following a staircase method (Levitt, 1971). For example, contrast decreases after a predetermined number of good answers (e.g. three) and increases after a predetermined number of mistakes (e.g. one).

Alternatively, said value representative of the dynamic contrast sensitivity may be a direct dynamic contrast sensitivity gain. Dynamic contrast sensitivity is the lowest contrast that can be perceived for each spatial frequency. Direct dynamic contrast sensitivity gain is the ratio between dynamic contrast sensitivity measured with the lens on dynamic contrast sensitivity without the lens.

First 100 and second steps 200 are performed in a first situation with no filter between the eye of the wearer and the light emitted toward said eye. The, first 100 and second 200 steps are then repeated with different filters having predetermined transmittance. In doing so, it is possible to have a value representative of a dynamic contrast sensitivity of the wearer for different filtering conditions. First 100 and 200 steps may be performed successively or in parallel to each other. In other words, the value representative of a dynamic contrast sensitivity may be determined after the whole first step 100 is complete or directly after the measurements.

Figure 8:
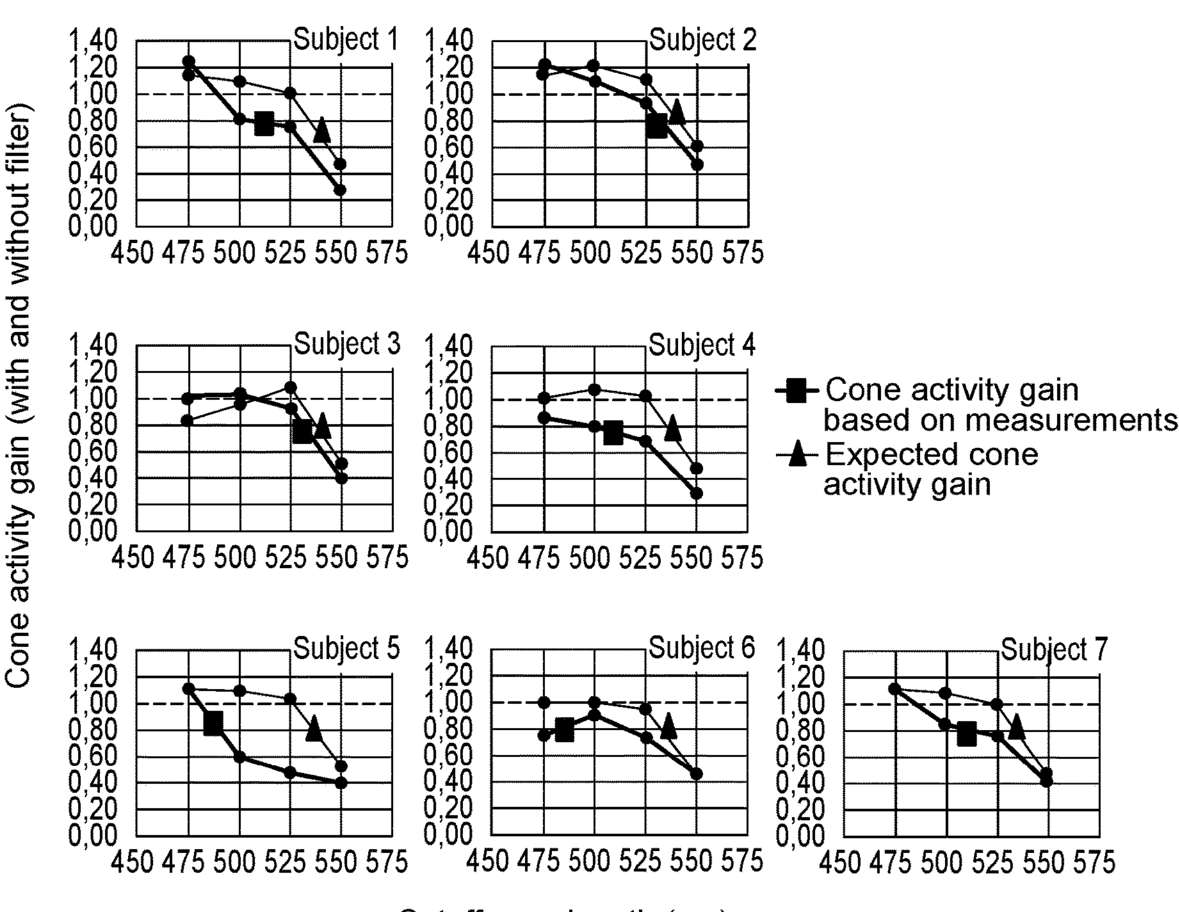
FIG. 8 shows a plurality of graphs illustrating cone activity gain as a function of the cutoff wavelength for an experiment involving seven subjects.

An example of results obtained after first and second steps is shown on FIG. 8. These graphs show cone activity gain calculated for seven subjects when subjected to a light stimulation having a luminance of 80 cd/m$^2$ for different cutoff wavelengths. It can be seen that four subjects in seven (subjects 1, 2, 5 and 7) showed an increased cone activity gain with 475 nm high pass filter from 9 to 22%.

Figure 9:
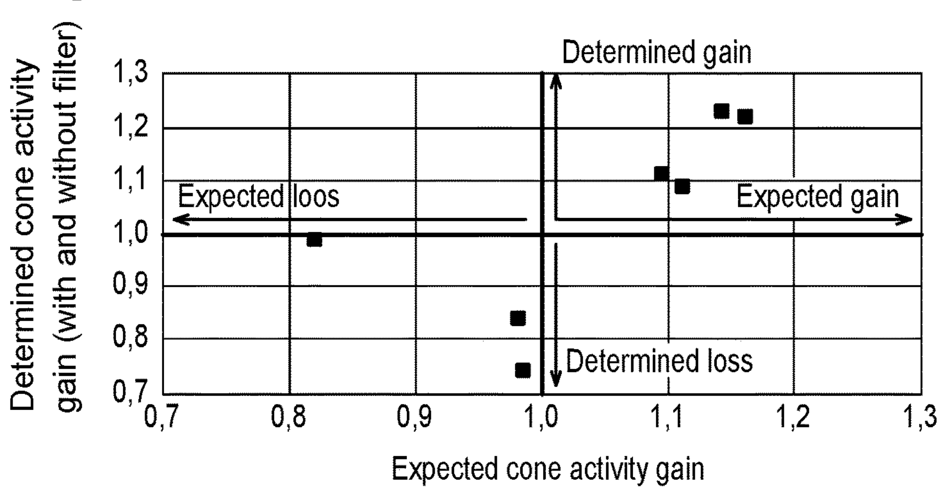
FIG. 9 shows a graph illustrating the gap between expected cone activity gain and cone activity gain calculated on the base of measurements for the experiment of FIG. 8 involving seven subjects.

These graphs show the cone activity gain which has been obtained after measurements as well as the cone activity gain which was expected considering different characteristics of the subjects. This expected cone activity gain is obtained using a prediction model. FIG. 9 shows the difference between the expected and determined cone activity gain for each subjected. It can be seen that, apart for the subjects 4 and 6, all subjects showed a cone activity gain close to or higher than the expected activity gain. These results therefore demonstrate the efficiency on the cone activity gain and thus motion perception.

In the third step 300, at least one light spectrum is selected based on the values improving the dynamic contrast sensitivity. In other words, specific cutoff wavelengths are selected based on the results of the second step 200, i.e. for which the cone activity gain is the most effective.

In the fourth step 400 a filter is then determined based on said at least one light spectrum. The filter preferably determined based on the at least one selected light spectrum and a selected transmission of the filter. The selected filter is preferably chosen as the one having the highest transmission (in the targeted range) producing the highest cone activity gain or the highest dynamic contrast sensitivity.

By the method of the invention, there can be provided any kind of lenses with an improved dynamic contrast sensitivity, for example transparent "white" (with high Tv) lens whose spectrum is cut within the identified wavelength range in step 300, or sun lenses having a specific cut within all or part of the visible range, wherein the cut in short wavelength range identified in step 300 Is imparted to this spectrum.

Alternatively, it is possible to select the identified short wavelengths range by using directly a sunlens in step 100 and 200, (needing an increase of the luminance of P(λ), as explained before) and acting on P(λ) (by cutting off leds or keeping P(λ) constant and directly providing the sunlens with a means filtering the short wavelengths, such as a filtering film laminated on the sunlens). It is even possible to have the sunlens already equipped with different filters filtering in the short wavelengths and retain the one providing the best improvement of dynamic contrast sensitivity.

To additionally improve the performance, it is possible to increase Tv of the lens in the remaining part of the spectrum of the sunlens up to highest level of Tv authorized by the class of the sunlenses:

Class 0: 81-100%
Class 1: 44-80%
Class 2: 19-43%
Class 3: 9-18%
Class 4: 3-8%

For increasing motion perception sensitivity, the filter may be a passive or an active filter composed of a 475 nm high-pass filter. When the filter is active, it may be a photochromic and/or electrochromic filter composed of a 475 nm high-pass filter for the darker state (sunglasses state). The active filter may be activated by pupil reaction and or/light sensor. Hence, spectral components of the filter may vary according to the pupil diameter or to the illuminance in order to increase or decrease the pupil diameter. Pupil reaction may be measured via an embedded sensor and/or camera.

For improving pupil reaction and glare protection, the filter may be provided on a photochromic lens composed of a high pass filter in the lightning state and low pass filter for the darkening state.

The invention claimed is:

1. A method for determining a filter for a visual equipment intended to be placed in front of the eye of a wearer, said filter being able to improve motion sensitivity of said wearer, the method comprising the following steps:

i. subjecting the wearer to a plurality of visible light spectra having different levels of light intensity within the range of wavelengths from 400 to 600 nm;
ii. determining a value representative of a dynamic contrast sensitivity of the wearer for each of the plurality of light spectra;
iii. selecting at least one light spectrum based on the values improving the dynamic contrast sensitivity; and iv. determining the filter based on the at least one selected light spectrum and selected transmission of the filter, wherein the filter is selected as having the highest transmittance in a targeted range.

2. The method according to claim 1, wherein the level of light intensity of at least one of the light spectra is reduced in a wavelength range from 400 nm to a value X; said value X ranging from more than 400 nm to 600 nm; and said value X differing for each of the light spectra.

3. The method according to claim 2, wherein the value X varies by increment from 400 nm to 600 nm between successive light spectra.

4. The method according to claim 1, wherein the step of determining the value representative of the dynamic contrast sensitivity of the wearer for each of the plurality of light spectra comprises the step of measuring the pupil diameter of the wearer for each of the plurality of light spectra.

5. The method according to claim 4, wherein the step of determining the value representative of the dynamic contrast sensitivity of the wearer for each 44 the plurality of light spectra comprises the step of determining the cone activity gain for each of the plurality of light spectra from the measurements of the pupil diameter.

6. The method according to claim 5, wherein the cone activity is determined from the pupil diameter using the following equation: cone activity=$(\Pi(Ø/2)^2 \times \int P(\lambda)\cdot(\lambda)\cdot V(\lambda)\cdot T_{crystalline}(\lambda)\cdot d\lambda)$; wherein Ø is the pupil diameter, P(λ) is the light spectrum, T(λ) is the lens transmission as a function of the wavelength (λ), V(λ) is the luminous efficiency of a photon as a function of the wavelength (λ) by photoreceptors and $T_{crystalline}(\lambda)$ is the lens transmission of the crystalline lens as a function of the wavelength (λ).

7. The method according to claim 6, wherein the cone activity gain is determined from the pupil diameter using the following equation: cone activity gain (age)=$(\Pi(Ø_1/2)^2 \times \int P(\lambda)\cdot T(\lambda)\cdot V(\lambda)\cdot T_{crystalline}(age,\lambda)\cdot d\lambda)/\Pi(Ø_2/2)^2 \times SP(\lambda)\cdot T(\lambda)\cdot V(\lambda)\cdot T_{crystalline}(age,\lambda)\cdot d\lambda)$; wherein Ø is the pupil diameter, P(λ) is the light spectrum, T(λ) is the lens transmission as a function of the wavelength (λ), V(λ) is the luminous efficiency of a photon as a function of the wavelength (λ) by photoreceptors and $T_{crystalline}(age,\lambda)$ is the lens transmission of the crystalline lens as a function of the age and the wavelength (λ).

8. The method according to claim 5, wherein the step of determining the cone activity gain takes into account at least one characteristic of the wearer to customize cone activity gain determination.

9. The method according to claim 1, wherein the value representative of the dynamic contrast sensitivity of the wearer for each of a plurality of light spectra is determined based on a perception test.

10. The method according to claim 9, wherein the perception test comprises the step of determining at least one feature of a dynamic visual stimulus.

11. The method according to claim 10, wherein the perception test comprises the step of determining the direction of the dynamic visual stimulus.

12. The method according to claim 1, wherein the plurality of light spectra comprises light spectra having a luminance ranging from 50 cd/m$^2$ to 300 cd/m$^2$.

13. An ophthalmic lens intended to be placed in front of the eye of a wearer to improve motion sensitivity of said wearer comprising a filter determined according to the method of claim 1.

14. The method according to claim 2, wherein the value X varies by increment from 400 nm to 600 nm between successive light spectra, by equal increments.

15. The method according to claim 2, wherein the value X varies by increment from 400 nm to 600 nm between successive light spectra, by equal increments of 25 nm.

16. The method according to claim 1, wherein the plurality of light spectra comprises light spectra having a luminance ranging from 100 cd/m$^2$ to 200 cd/m$^2$.

* * * * *